J. H. B. HOSEMANN.
COMBINED HARROW AND LEVELER.
APPLICATION FILED FEB. 26, 1912.
1,034,619.
Patented Aug. 6, 1912.
2 SHEETS—SHEET 2.
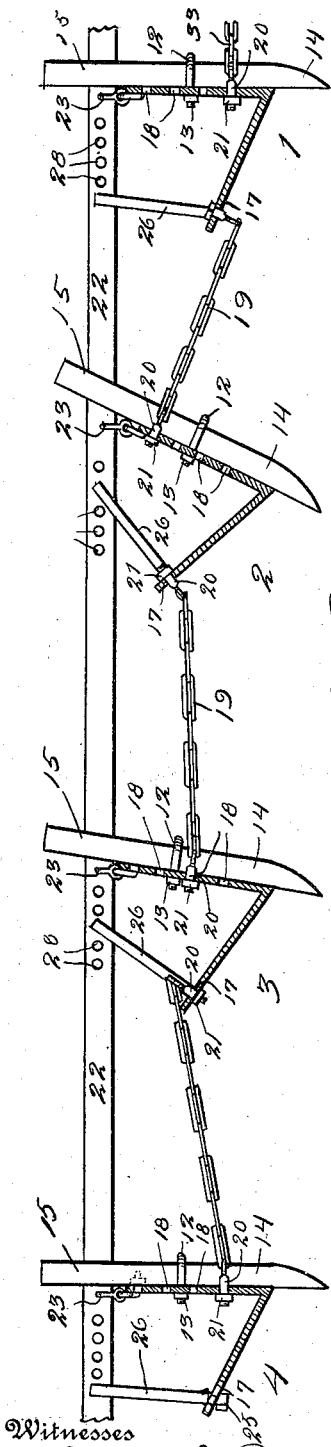
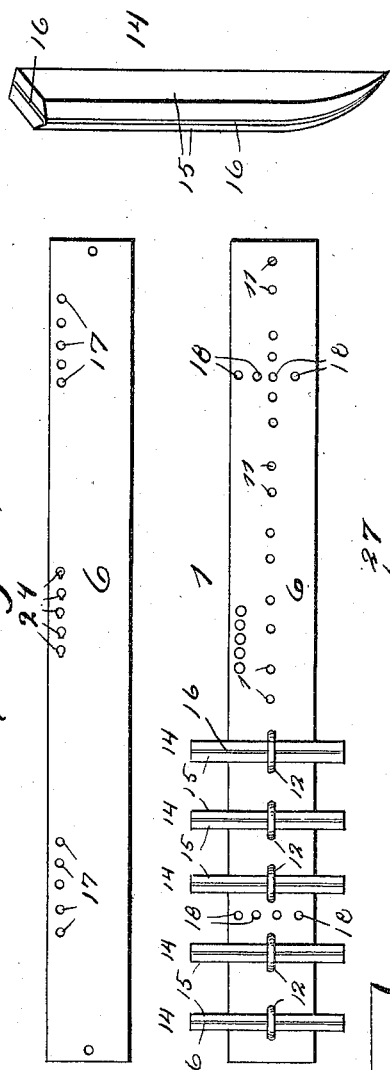
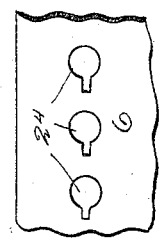
Inventor
John H. B. Hosemann
Witnesses
J. Milton Lester
B. F. Washburne
By C. L. Parker
Attorney

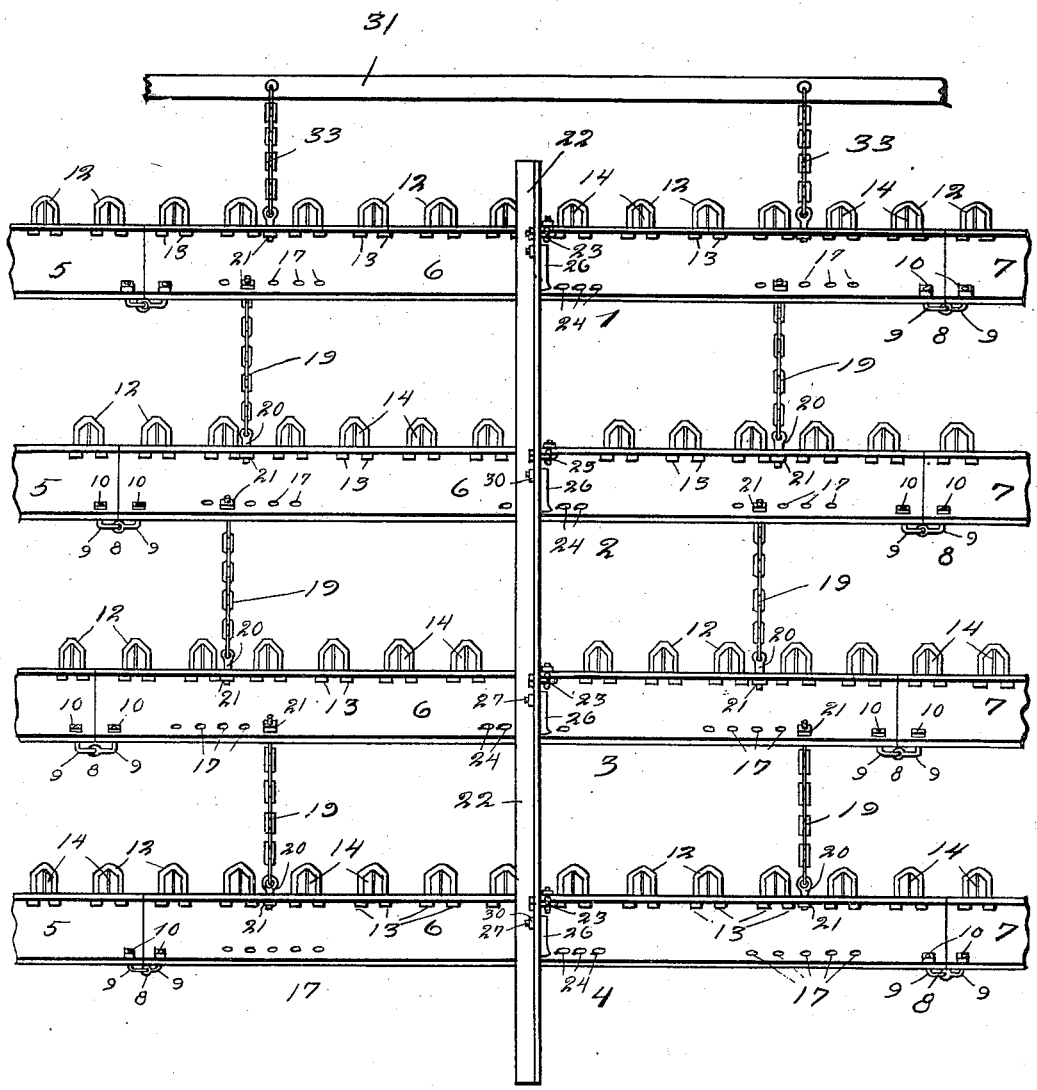

UNITED STATES PATENT OFFICE.

JOHN H. B. HOSEMANN, OF LEWISTOWN, MONTANA.

COMBINED HARROW AND LEVELER.

1,034,619.　　　　　　Specification of Letters Patent.　　Patented Aug. 6, 1912.

Application filed February 26, 1912. Serial No. 679,973.

*To all whom it may concern:*

Be it known that I, JOHN H. B. HOSEMANN, a citizen of the United States, residing at Lewistown, in the county of Fergus and State of Montana, have invented certain new and useful Improvements in a Combined Harrow and Leveler, of which the following is a specification.

The present invention relates to a combined harrow and leveler.

An important object of my invention is to provide novel means to hold teeth carrying beams in vertical adjustment at different angular positions.

A further object of this invention is to provide novel adjustable means for connecting the teeth carrying beams so that they may be arranged in relatively different longitudinal positions to hold the teeth in different staggered positions.

A further object of my invention is to provide a combined harrow and leveler which is positive in operation, easy to operate, and durable.

Other objects and advantages of my invention will be apparent during the course of the following description.

In the accompanying drawings forming a part of this specification and in which like numerals are employed to designate like parts throughout the same, Figure 1 is a plan view of the device, Fig. 2 is a longitudinal sectional view through the same, Fig. 3 is a rear side view of a tooth carrying beam, Fig. 4 is a similar view of the opposite side of the same, Fig. 5 is an enlarged fragmentary detail view of a portion of the teeth carrying beam, showing the key-hole openings formed therein, Fig. 6 is a perspective view of a connecting element or key, Fig. 7 is a similar view of a pivotal connecting element, Fig. 8 is a perspective view of a tooth, and, Fig. 9 is a similar view of an element for securing the tooth to the tooth carrying beam.

In the drawings wherein for the sake of illustration, I have shown a preferred embodiment of my invention, the numerals 1, 2, 3 and 4 designate teeth carrying beams. These teeth carrying beams are alike and each is formed of a plurality of sections 5, 6 and 7 of suitable lengths and arranged in end to end relation. The ends of these sections are pivotally or flexibly connected by means of a hinge 8 (see Fig. 7), which is formed of two eye-bolts 9. The free ends of these eye-bolts are screw-threaded and extend through openings in the sections and are provided with nuts 10. Each section of the teeth carrying beams is substantially V-shaped in cross-section, as shown. Each section is provided upon its forward side with horizontally arranged spaced pairs of openings 11, for receiving the free ends of a clamping U-bolt 12 (see Figs. 4 and 9). These clamping U-bolts carry clamping nuts 13 on their free ends, as shown. The U-bolts 12 receive and hold teeth 14 upon the forward side of the section or sections of the teeth carrying beams. It is thus seen that these teeth 14 may be moved longitudinally with relation to their beam and clamped thereto in adjustment at different positions. I preferably construct each of the teeth 14 of two outer sections 15 of wrought steel, having their longitudinal cutting edges beveled, as shown. Between these outer sections is a strip 16 of tool steel. These different portions of the tooth are securely united by being welded or riveted together. These teeth are self sharpening. Each of the sections 6 is provided upon its rear side and near the ends of the upper longitudinal edge thereof with horizontally disposed spaced openings 17. Each of the sections 6 is provided upon its opposite or forward side with vertically spaced openings 18.

The numeral 19 designates draw chains provided at their ends with eye-bolts 20, carrying nuts 21 upon the free ends thereof. As is more clearly shown in Fig. 2, the chains 19 which connect the teeth carrying beams 3 and 4, have the eye-bolts 20 attached to the rear ends thereof, inserted in the lowermost of the openings 18. The eye-bolts 20 attached to the opposite ends of these chains are preferably run through the openings 17 in a rearward direction, as shown in Fig. 2, whereby the chains 19 extend over the upper longitudinal edge of the section 6. The chains 19 connecting the teeth carrying beams 2 and 3 have the eye-bolts 20 attached to the rear ends of these chains passed through the third openings 18 from the top and the eye-bolts attached to the opposite ends thereof passed through the openings 17. The chains 19 connecting the beams 1 and 2 have eye-bolts 20 attached to the rear ends thereof inserted in the uppermost openings 18 and the eye-bolts carried by the opposite ends inserted through the openings 17. Attention is called to the fact that the beam 4 is now in such an angular position that its teeth are substantially vertical, the beam 3 in a position to hold its teeth in a slightly inclined position, the beam 2 in a position to hold its teeth at a greater angle, and the beam 1 in a position to hold its teeth vertical. Attention is called to the fact that the teeth 14 are arranged in staggered rows extending longitudinally of the device. In order that the teeth carrying beams may be adjusted longitudinally to change this staggered arrangement of the teeth 14, I have provided the spaced openings 17. It is thus seen that by inserting the forward eye-bolts 20 in corresponding openings of the sets 17, the pull on the draw chains 19 will cause them to straighten and hence the teeth carrying beam attached to their rear ends will assume its requisite position. Assume that it is desired to adjust or move the beam 2 to the right with relation to the beam 1, the forward eye-bolts 20 are inserted in the third openings 17 from the left formed in the beam 1. When the device is drawn forwardly, it will be seen that the beam 2 will be swung to the right, in order that the chains 19 may straighten themselves to coincide with the longitudinal pull. Each of the teeth carrying beams may be longitudinally adjusted in a similar manner.

The numeral 22 designates a rail which is L-shaped in cross-section and is disposed above the beams 1 to 4, inclusive, and extends transversely thereof. The forward side of the teeth carrying beams is pivotally connected with this rail by means of hinges 23 in the form of connecting links. The rear side of each of the sections 6 is rigidly and detachably connected with the rail 22 by means of a rod 26. Each of the sections 6 is provided on its rear side and midway the ends thereof with horizontal spaced keyhole openings 24, to receive the key portion 25 formed upon the rear end of the rigid connecting rod 26. This rigid connecting rod is provided near its forward upper end with a screw-threaded lateral extension 27, adapted for insertion within one of spaced openings 28 formed upon the rail 22. The extension 27 is held within the opening 28 by a nut 30. It is thus seen that these rods 26 are detachably connected with the sections 6 and rail 22 and serve to hold them in desired vertical angular positions, as clearly shown in Fig. 2.

Any preferred form of draft gear may be employed in connection with my device. Such draft gear is attached to a forward transverse bar 31, which is connected with the section 6 of the teeth carrying beam 1, by means of chains 33 or the like.

The operation of the device is as follows:—The teeth carrying beams may be adjusted to assume different vertical angular positions so that the teeth 14 will assume such positions. The teeth carrying beams may also be adjusted longitudinally of the rail 22 so that the or transversely of the rail 22 so that the staggered arrangement of the longitudinal rows of teeth may be varied. This easy adjustment of the device renders it particularly well adapted to fulfil its function. The shape of the teeth carrying beams renders them particularly adapted to level off the ground as it is dug up by the teeth which adaptability is not appreciably altered or affected by their vertical angular positions being changed. The teeth 14 may also be longitudinally adjusted so that they may extend the desired distance beyond the apex of the beams.

I have found that the device may be operated by dispensing with the rail 22 and having the teeth carrying beams simply connected by the chains 19.

It is to be understood that the form of my invention herewith shown and described is to be taken as a preferred example of the same and that certain changes in the shape, size, and arrangement of parts may be resorted to without departing from the spirit of the invention or the scope of the subjoined claims.

Having thus described my invention, I claim,

1. In a device of the character described, a plurality of beams formed substantially V-shaped in vertical cross-section to serve as a leveling device, teeth connected with the beams and having their cutting ends extending therebelow, and means connecting the beams.

2. In a device of the character described, a plurality of beams having their joining walls disposed at an angle of less than forty-five degrees, teeth mounted upon the beams and having their cutting ends extending therebelow, and means connecting the beams.

3. In a device of the character described, a plurality of teeth carrying beams, one of the teeth carrying beams being provided with horizontally arranged spaced openings and the other teeth carrying beam being provided with vertically arranged spaced openings, and a flexible element carrying at its opposite ends bolts for insertion within certain of the spaced openings.

4. In a device of the character described, a plurality of beams formed V-shaped in vertical cross-section, teeth adjustably connected therewith, and means connecting such beams.

5. In a device of the character described, a plurality of teeth carrying beams, a rail extending transversely thereof, means pivotally connecting the teeth carrying beams with the rail, flexible elements having adjustable connection with the teeth carrying beams, rods connected with the teeth carrying beams, said rail being provided with a plurality of spaced openings to afford adjustable connections between the rail and said rods.

6. In a device of the character described, a plurality of teeth carrying beams formed V-shape in cross-section, flexible elements attached to one beam, and means whereby the flexible elements may be connected with the other beam at different distances from its upper longitudinal edge.

7. In a device of the character described, a plurality of teeth carrying beams formed V-shape in cross-section, and flexible elements having adjustable connections with the beams.

8. In a device of the character described, a plurality of teeth carrying beams provided upon corresponding portions with key-hole openings, a rail extending transversely thereof and provided with perforations, rods having key portions for insertion within the key-hole openings and extensions for insertion within the perforations, and means to retain such extensions in said perforations.

9. In a device of the character described, a plurality of beams formed approximately V-shaped in vertical cross-section and having their tapered ends disposed lowermost, teeth connected with the beams and extending therebelow, and flexible elements connecting the beams.

10. In a device of the character described, a plurality of hollow beams formed substantially V-shaped in vertical cross-section, teeth carried by the beams and having their cutting ends extending therebelow, means connecting the beams, and means to securely hold the beams in adjustment at different angular positions when the entire device is in operation.

In testimony whereof I affix my signature in presence of two witnesses.

JOHN H. B. HOSEMANN.

Witnesses:
H. LEONARD DE KALB,
J. A. GAMBLE.

Copies of this patent may be obtained for five cents each, by addressing the "Commissioner Washington, D. C."